(12) United States Patent
Rosenberger

(10) Patent No.: US 7,885,854 B2
(45) Date of Patent: Feb. 8, 2011

(54) PROMOTION METHOD

(76) Inventor: Ronald John Rosenberger, 6 Partridge Ct., Newtown, PA (US) 18940

( * ) Notice: Subject to any disclaimer, the term of this patent is extended or adjusted under 35 U.S.C. 154(b) by 0 days.

(21) Appl. No.: 12/631,216

(22) Filed: Dec. 4, 2009

(65) Prior Publication Data

US 2010/0145782 A1 Jun. 10, 2010

Related U.S. Application Data

(63) Continuation of application No. 10/613,392, filed on Jul. 3, 2003, now abandoned, which is a continuation-in-part of application No. 09/634,612, filed on Aug. 5, 2000, now abandoned.

(60) Provisional application No. 60/394,402, filed on Jul. 8, 2002.

(51) Int. Cl.
*G06Q 30/00* (2006.01)

(52) U.S. Cl. ..................................................... 705/14.4

(58) Field of Classification Search ................. 705/14.4
See application file for complete search history.

(56) References Cited

U.S. PATENT DOCUMENTS

| 5,992,888 | A | * | 11/1999 | North et al. | 283/56 |
| 7,266,839 | B2 | * | 9/2007 | Bowers et al. | 726/8 |
| 7,287,011 | B1 | * | 10/2007 | Wood et al. | 705/65 |
| 2003/0040963 | A1 | * | 2/2003 | Kogler et al. | 705/14 |
| 2003/0126015 | A1 | * | 7/2003 | Chan et al. | 705/14 |

* cited by examiner

*Primary Examiner*—James W Myhre
(74) *Attorney, Agent, or Firm*—Guy Kevin Townsend

(57) ABSTRACT

Disclosed is a method and system of using mentions/advertisements as a means to provide incentive or compensation for potential promoters to introduce end users to an offering entity, where mentions/advertisements for the benefit of the promoter are included in communications between the offering entity and end users. An additional function that enables promoters to send communications to the end users is disclosed as well.

12 Claims, No Drawings

PROMOTION METHOD

CROSS REFERENCE TO RELATED APPLICATIONS

This application is a continuation of USPTO non-provisional application Ser. No. 10/613,392, filed Jul. 3, 2003 now abandoned, which is a continuation-in-part of USPTO non-provisional application Ser. No. 09/634,612, filed Aug. 5, 2000 now abandoned. The abovementioned application is entirely incorporated herein by reference. This application also claims benefit from provisional application number 60/394,402, filed Jul. 8, 2002, which is also entirely incorporated herein by reference.

BACKGROUND OF THE INVENTION

At countless outlets around the world, there are small credit card displays that contain applications for credit card offerings from American Express. As it turns out, these applications are coded with information reflecting the promoter that provided the location for the credit card display. In many instances, a promoter is the owner or management of a small business that provides a small space where members of the general public can take a card application from the credit card application display. Should an application results in an opened account, a fee is paid to the promoter, whose identity is determined by the code that appears on the application. For example, if an individual picks up an American Express credit card application from a pamphlet display at Joe's Pizza Parlor, applies for the credit card, and the credit card account is subsequently opened and the credit card is issued, then American Express will financially compensate Joe's Pizza Parlor for its efforts as a promoter based on the coded application.

Industries, business entities, and non-profit entities spend billions of dollars a year promoting goods and services. In the year 2000, drug companies spent $15.7 billion on promotional expenditures. In the same year, the drug company Merck & Co. spent $160.8 million to promote a single drug ("Vioxx"). Drug companies especially focus on direct-to-consumer advertising, with the desired end result being the patient asking the physician about certain drugs by name. Every indication shows that the strategy works well. While it is conceivable that a company could pay to have advertising placed on communications (such as a billing statement for a credit card) there are other means that are worth consideration.

SUMMARY OF THE INVENTION

Unlike the above example where Joe's Pizza Parlor receives money from the issuing entity (hereafter known as "the entity") for every end user that signs up for a credit card using a coded application from its application display, the method disclosed here teaches compensating a promoter such as Joe's Pizza Parlor by giving the promoter a mention, or other forms of advertisement in the communications that the entity sends to the end user. The mention/advertisements may be used in place of, or in addition to, financial remuneration from the entity to the promoter.

The method that is to be presented here has great flexibility, and may be applied in myriad ways. The method comprising applications and accounts may be used to promote any financial card that is used in a credit or debit/ATM capacity. Furthermore, the method may be used to promote anything, such as a service (such as bank account services, checking account services, Internet services, heating and air conditioning service contracts, drug discount program, etc.), or such as products (such as weekly bottled water deliveries, magazine subscriptions, newspaper subscriptions, fruit of the month club, etc.), that uses, or that can be adapted to use, an application process. Also, the method comprising applications and accounts may be adapted for use in promoting advertisements to end-users, where an "application" that is filled out and returned results in the end user receiving advertisements. Advertising entities may be a primary advertiser entity (advertising its own products or services), or third-party advertiser entity (an advertiser for hire, whose service comprises performing advertising functions for one or more client entities). An application and account may also be for an end user to receive reminders, tips, or suggestions for health related, non-health related, or health and non health related matters, either in concert with the above-mentioned financial cards, services, products, or advertisements; or in absence of financial cards, services, products, or advertisements. Finally, an application and account may be for an end user to receive financial cards, services, products, or advertisements in absence of reminders, tips, or suggestions.

The following discussion focuses on how the method works with regards to encouraging others to promote a given entity's credit card that also features health reminders, tips, or suggestions.

Drug companies have legions of young, attractive representatives that go from one doctor's office to another, hoping to have a minute with a given physician in order to promote a particular drug company's offerings. Drug reps will offer inducements, such as providing lunch for the office staff, or tickets to events, as a means of gaining the physician's favor in prescribing the drug company's products. A typical drug rep calls upon many physicians in a single year. These reps could provide a great conduit of credit card promotion if given the proper incentive. Here is an instance using the Pink Card, with its features of health reminders, tips, and suggestions, as an example. A drug rep calls upon a physician with a new program aimed at the mutual benefit of the drug company, physician, and the patient. The drug rep carries in a small credit card display filled with Pink Card applications. The rep explains to the physician that the Pink Card not only offers credit card services, but also offers mammogram reminders, OB/GYN reminders, and monthly breast self-exam reminders (although the health reminder disclosure extends to any aspect of health, regardless of gender) in conjunction with the card's transaction/activity statement (just to name one embodiment). The drug rep also explains that the applications are coded with the drug company's identifier, and a special identifier for that particular physician. Each patient that procures a credit card by using an application provided by the drug company and the particular physician will not only receive health reminders via the card issuer, but an additional mention as well in conjunction with communications comprising the health reminders:

"THESE HEALTH REMINDERS ARE PROVIDED COURTESY OF DR. IVAN SCHWARTZ, (000) 555-1111; AND DRUGCO, MAKERS OF ABC, AND DEF, WHICH ARE APPROVED BY THE FDA AS BEING SAFE AND EFFECTIVE."

It is also possible to use the mechanism in the absence of reminders, tips, and suggestions. Such a mention would be as follows:

"THESE CARD SERVICES ARE PROVIDED IN ASSOCIATION WITH DR. IVAN SCHWARTZ, (555) 000-1111;

AND DRUGCO, MAKERS OF ABC, AND DEF, WHICH ARE APPROVED BY THE FDA AS BEING SAFE AND EFFECTIVE."

Keep in mind that the above mentions have the capability to appear every time a transaction statement and/or reminder is issued. Terms may be negotiated as to whether the mentions/advertisements will appear on just a limited number of statements, or will continue for the entire time that the card is in force. Other capabilities include changing any or all aspects of the information of the mentions/advertisements, such as the drug company's new product launches or phone number updates. Should a physician choose to sell his practice, a large quantity of patients that hold a card where the physician's name is inscribed and reinforced continually could be deemed a very valuable asset, especially since the new physician's name could be readily substituted for the old physician's name, which will help make the new physician's name a "household word", possibly reducing patient attrition for the new owner of the medical practice. A secondary market can even emerge with brokers buying and selling patient lists among physicians, or even among drug companies. Of course, text and content of the mentions/advertisements may appear per the whims of the parties that are involved, with the drug rep possibly offering the physician a choice of configurations.

Let's see who wins in this scenario:

The cardholder wins with health reminders that may enable the cardholder to live a longer and healthier life.

The physician wins by appearing as being especially caring for the welfare of his patients, not to mention the fact that the cardholder list could become a valuable promotion tool and business asset that doesn't cost the physician anything.

The drug company wins with direct-to-consumer advertising that is potentially perpetual for the life of the card; also, in the eyes of the patient, the physician's name and drug company's name are "forever" bound in ink (or computer code), which will hopefully lend credibility to the drug company; also, the drug company avails itself to the possibility that the physician could view his relationship with the drug company as an informal "partnership" or association (again, due to being "bound in ink") that ultimately results in the physician prescribing the drug company's products preferentially. Costs to the drug company are negligible. Potentially, the only costs that will be borne is the time that is required in promoting the cards, whereas the card entity will bear most if not all of the expenses of delivering the reminders/mentions/advertisements.

The credit card entity wins by getting new cardholders; also, by being associated in print with a physician that the cardholder (hopefully) trusts and respects, it is possible that the cardholder could view the physician's association as a defacto endorsement of a particular card issuer, which lends to the card issuer's image. Also, by offering health related reminders, tips, and suggestions, it is possible that a physician could recommend the card entity's products as a valuable means of providing or reinforcing health awareness for the benefit of the patient.

It is quite possible that the synergy that this invention encourages between the patient, doctor, drug company, and credit card issuer could represent a new dynamic that promotes a whole new level of relationships and brand building among theses four factions. Over time, the end result could prove much more effective and beneficial than merely paying a one time fee to the promoter whose code appears on a "winning" card application.

The example above illustrates the application as being a credit card application. A drug company could wish to promote its own co-branded credit card, or could choose not to have anything to do with financial cards, and simply offer applications for health reminders, tips, or suggestions that would emanate from the drug company (or a third party associated with the drug company that performs some or all of the method steps of supplying the health reminders, tips, or suggestions). The drug company could use the circulation of said health reminders as means of delivering advertisements (as taught by a related CIP application) about new drugs to the end user. Also, the drug company can provide (as mentioned earlier) a drug discount program that uses a sign-up application process that may or may not make use of health reminders, tips, or suggestions. The common thread is that regardless of what the application pertains to, the drug company receives mention as either a promoter, or perhaps as the originating entity, and the physician receives mention due to being the promoter that makes the applications available to his patients.

The parent application makes reference to the Green Card, which features environmental/gardening/planting reminders. An example of mentions/advertisements is as follows:

"THESE GARDENING AND PLANTING REMINDERS ARE PROVIDED COURTESY OF BOB'S GARDEN SUPPLY, (000) 555-8888; AND GREENTURF INC, MAKERS OF WEED-NO-MORE AND GROW-GRASS-GROW."

Such a mention could be very valuable to a small company such as Bob's Garden Supply, which really needs all the customer loyalty aids that it can get, especially since it is trying to compete with giant entities such as Home Depot and Lowe's. The fact that the repeated impressions on numerous customer card transaction statements possibly won't cost Bob's Garden Supply anything should offer proper incentive to offer the card applications. Also, Greenturf gets direct-to-customer promotion for its products, and also gets the attention of Bob's Garden Supply, being that the Greenturf representative makes all of this possible. This could result in Greenturf having an advantage over the competition when it comes time for Bob's Garden Supply to order inventory stock. Having customers ask for Greenturf products by name, thanks to repeated direct-to-customer mentions/advertising, is certainly a helpful brand builder for Greenturf. Finally, the card entity should at least get Bob of Bob's Garden Supply, as well as some of Bob's employees, family and friends as new cardholders, because it is likely that Bob will enjoy seeing his company's name imprinted on a card transaction statement. Greenturf could promote its own co-branded card, or simply choose to avoid financial cards entirely and offer instead signup applications for home and garden related reminders, tips, or suggestions, or signup applications for advertising comprising coupons, special offers, catalogs, brochures and other promotional literature, or signup applications for special programs, or information dissemination (such as newsletters comprising recipes for those great vegetables that Greenturf helped grow), with or without home and garden related reminders, tips, or suggestions. Regardless, the applications would be coded to ensure that Bob's Garden Supply receives acknowledgement. There is a distinction that needs to be made at this time. A business such as Bob's Garden Supply is not like a franchisee whose parent company sends out advertisement flyers with the franchisee's name and contact information attached based on a mailing list. A business such as Bob's Garden Supply may have several (if not numerous) vendors, each competing with each other for Bob's business. This method, using coded applications for anything that uses, or can be adapted to use, an application process, is intended to act as a tool that enables the vendor that supplies this method for the benefit of Bob's Garden Supply an advantage over other vendors.

Also disclosed is an optional mechanism in the method where the promoter obtains a listing of end users ("end users" being defined as a term for the individuals that have completed and submitted applications) that are the result of the promoter's efforts. This enables the promoter to see the names of all the end users he has enlisted. While a card entity may make this list available to the promoter for whatever purpose, the method may be enhanced with a file maintenance feature that enables the promoter to provide a message to the end user that will appear in communications that will ultimately be received by the end user.

DETAILED DESCRIPTION OF THE INVENTION

The method entails where a promoter receives mentions/advertisements as a means of full or partial compensation from an offering entity for each new sign-up of end users generated by the promoter. The mentions/advertisements appear in communications that are provided by the offering entity either directly or indirectly (through a third party) to the end users. The mentions/advertisements of a given promoter appear in communications of the end users that were introduced or established through the efforts of the given promoter. It should be mentioned that any or all steps of the method may be performed either directly by the entity, or indirectly by a third party or third parties, where the third party or third parties are associated with, retained by, referred by, or linked via Internet or intranet with the entity, or by any combination or permutation of the entity and third party or parties. For example, a third party could perform all computer-related functions of the method, while other functions (such as distribution of applications or the issuing of communications) could be performed by the offering entity.

Once promoters are solicited, the first step is establishing a file comprising information comprising the mentions/advertisements of the promoter. The content of this file may comprise any information that is desired by the promoter. The entity may allow the promoter full capability with regards to editing the file without assistance from the entity, may allow some capability, or may restrict access entirely, where editing must be done by the entity (for quality control purposes). Editing comprises the ability to add, modify, revise, or delete the content of the file. For example, the promoter may have an address change that he wants end users to know about, or a promoter whose business is pharmaceuticals may wish to make end users aware of a new drug. The offering entity can establish any parameters, or any limitations on any aspect of the file comprising the mentions/advertisements, along with maintaining full editing capability of the file. Access to the file may comprise any communicative means or embodiment that enables the file to be accessed. Examples include providing full promoter access via the Internet to allow the promoter to perform file maintenance functions; or, allowing the promoter to phone a call center where the representative makes, regulates, and approves changes. The entity can allow the promoter to keep and use the file without any fee, or may levy fees to the promoter for any aspect of maintaining, accessing, or modifying the file. Any scenario may occur, such as charging fees to nuisance promoters that use up excessive entity resources, while allowing light users to go about their business free of charge.

From here, the file information is stored on a computer readable medium.

Next, is the establishment of a code that cross-references the code to the file information, resulting in coding information. This coding information is stored on a computer readable medium. It must be stressed that in disclosing this method, various steps may be eliminated, enhanced, or even added, where such additions are is within the spirit and scope of the method. For example, the file information may already comprise a code, thus rendering the method step comprising additional cross-referencing of the code to the file information unnecessary.

Applications may then be distributed or be otherwise made available comprising a promoter code or a plurality of promoter codes. The applications may comprise any communicative embodiment or format, from a printed application on a table or counter display to an application accessed on a website. The application process may even be performed over the phone by calling a call center. While the promoter code may comprise any form, format, or method, the embodiment of the promoter code should be somewhat relevant to the embodiment of the application (although, being that anything is possible, exceptions could apply). For example, a printed application would have the promoter code in the form of a printed alphanumeric or bar code that is ultimately read or scanned, and a website application could have a promoter code in the form of embedded coding information, while a promoter code in the case of using a call center could be as simple as providing the entity that is taking the application information with the name of the promoter (such as the physician's name), which may or may not need to be, either manually or automatically, translated into another, more computer-friendly promoter code. Applications may comprise a singular promoter code that corresponds to a single promoter, or a singular promoter code that corresponds to a plurality of promoters, where a single promoter code identifies, say, both the drug company and the physician. Applications may also comprise a plurality of promoter codes, where each of the plurality of promoter codes corresponds to either a singular promoter, or a plurality of promoters.

Next is where the end-user completed applications comprising the promoter codes are redeemed and processed. Accounts are established based on the processing of the applications that comprise the promoter code. As mentioned earlier in the disclosure, accounts may comprise any product or service that makes use of, or can be adapted to use, an application process.

Now comes the issuing of communications to the end users that may basically be described as accountholders, although some, especially those that sign up for advertisements or for reminders, tips, or suggestions, could consider the term a bit excessive. The range of possible communications is as varied as the account matters that they represent, and is further compounded by variations and permutations of embodiments and delivery modes.

Communications may comprise anything that is relevant or non-relevant to the account. For example, for a credit card account, a transaction portion would be relevant to the account, while an attached discount card for a theme park would have no particular relevance to credit card account matters. With regards to communications regarding advertisements, a coupon for a free oil change would be relevant to the "account", while an additional message that says, "Have a nice day" wouldn't be deemed especially relevant, but polite nonetheless. Communications may comprise any communicative means or embodiment. For example, a bill for a bottled water service may be mailed or faxed, while an advertising coupon may be sent as an e-mail attachment that is subsequently opened, printed out, and used. Likewise, reminders, tips, or suggestions may comprise any communicative means or embodiment. The communications and reminders, tips, or suggestions may be conjoined, not conjoined but sent together, or sent separately from each other, where the communications and reminders, tips, or suggestions may comprise identical, similar, or different communicative means or embodiments. An example is where an advertising coupon is mailed, while the associated health reminders, tips, or suggestions are e-mailed. Nonetheless, in deference to the promoter or promoters, the communications and/or reminders, tips, or suggestions would comprise at least one mentions/advertisement for the benefit of the promoter or promoters.

Mentions/advertisements may continue to appear in communications and/or reminders, tips, or suggestions for either the entire time that end user account is kept in force by the end user or the entity, or for only a limited time determined by any of the involved parties, or by any other factor. The potential variants are limitless. For example, the offering entity may choose to allow a given promoter's mention/advertisements for the life of the end users account (preferably for no charge to the promoter), or for a determined period. Another example is where the determined period comprises the offering entity allowing the promoter's mentions/advertisements appear at no cost to the promoter for, say, two years, and then allowing the mentions/advertisements to continue for a fee.

Optional mechanisms mentioned earlier comprise the following.

The first is where the listings of accounts that are generated or established through the efforts of a promoter are made available to the promoter, where access to the listings may be made using any communicative means or embodiment that enables the listings to be accessed. An example is where a physician can view a list of end users that he has signed up after logging onto a website, and after entering his personal code and/or password. Another example is where the physician phones a call center, provides proper identification, and then has the list sent to him via fax.

The second is an extension of the first where the listings of end users/accounts that are generated or established through the efforts of a promoter allows for a file maintenance function where the promoter may add, modify, revise, or delete information/messages/text that will be communicated to the end user. While this may be considered as, and may be used as, a means of sending a broadcast to all of the end users/accounts that the promoter has generated, the real value here is that the promoter has the ability to send an individualized message to a given end user. For example, a physician can notify a particular patient that it is time for physical examination by using any communicative means or embodiment. The physician logs onto the originating entity's website, accesses his end users that he has generated through his promotion efforts, scrolls down to a particular end user, enters a message, and that message is ultimately communicated by the offering entity to the end user Likewise, the physician can phone a call center, and have a representative input the physician's desired message that will be communicated by the offering entity to the end user. Management of information/messages/text may employ automation for any desired parameter or function, such as where the information/messages/text cycles at a predetermined time, or for a predetermined duration. Information/messages/text may be used as announcements, notices, or reminders from the promoter to the end user, and are unlike health reminders, tips, or suggestions due to the fact that health reminders, tips, or suggestions are at the behest of the offering entity rather than the promoter, even though information/messages/text emanates from the offering entity as well. Information/messages/text may be relayed to the end user utilizing any communicative means or embodiment.

Here is an opportunity for a pharmaceutical company to really curry a physician's favor. With all of the expenses that physicians face today, the costs of printing and mailing appointment reminders is cause enough for physicians not to do them. A physician may have one of his office staff set up a file of all his patients with the issuing entity (in this case, the pharmaceutical company). This list of end users would additionally comprise contact information such as mailing or e-mail addresses, which would bypass the individual end user application/account process method steps in the disclosed method. From here, the physician uses the information/messages/text function to have the pharmaceutical company sends out the appointment reminders to the end users (AKA patients), thus saving the physician time and money. While this is going on, there is nothing to stop the pharmaceutical company from using an advertisement for its fabulous new drug as a carrier medium for the appointment reminders, or adding the end users to mailing lists for other purposes (unless the physician and/or end users find it distasteful). In this sense, and in terms of the method disclosed, each of the end users/patients comprises an individual "account", while the physician that provides the listing of end user/patients and the information/messages/text is the promoter that makes the end users/patients known to the pharmaceutical company (AKA the offering entity). As a safeguard, the offering entity can confirm to the promoter that the communications have been sent, and the means of informing the promoter may comprise any communicative means or embodiment. In reference to the above example, this use of the method could really intertwine a pharmaceutical company with a physician, which would undoubtedly prove advantageous to the pharmaceutical company.

As a note, the information/messages/text may appear as follows: in conjunction with, or in absence of communications; in conjunction with, or in absence of reminders, tips, and suggestions; and/or in conjunction with, or in absence of, mentions/advertisements, in any combination or permutation.

Method claims are also presented with corresponding system claims.

Considering the many variations with regards to applications, it is possible for the disclosure to be practiced in myriad ways. It is anticipated by the Applicant that the full potential, spirit and scope of the disclosure, as well as its equivalents, will be apparent to those skilled in the art.

The invention claimed is:

1. A method for a merchant to receive advertisements issued by a financial card institution for full or partial compensation from said financial card institution for financial card product or service account sign-ups of end users generated by said merchant using account applications for said account sign ups, comprising:
    (a) providing on a computer network a computer readable file comprising said advertisements for said merchant;
    (b) storing on a computer network said computer readable file on a computer readable medium;
    (c) providing on a computer network a merchant code that cross references said merchant code to said advertisements associated with said account applications,
    (d) distributing said account applications comprising said merchant code;
    (e) processing, on a computer network, redeemed applications comprising said merchant code;

(f) establishing on a computer network said accounts for said end users based on said processing of said redeemed account applications comprising said merchant code; and (g) issuing communications to said end users of said accounts, where said communications comprise said advertisements, wherein said merchant does not co-brand a financial card with said financial card institution or wherein said merchant does not issue or sponsor a private label credit card.

2. The method of claim 1, wherein said advertisements appear in said communications for a time period set by said financial card institution.

3. The method of claim 1, wherein said financial card institution charges fees to said merchant for one selected from maintaining, accessing, or modifying said file information.

4. The method of claim 1, wherein said merchant can add, modify, revise, or delete information that will appear in said communications.

5. A method where a promoter receives advertisements as a means of full or partial compensation from a product or service offering entity for each new account sign-up of end users generated by said promoter, comprising:

(a) providing a file comprising said advertisements for said promoter;
   (b) storing said file on a computer readable medium;
   (c) providing a promoter code that cross references said promoter code to said file information on a computer readable medium;
   (d) distributing said account applications comprising said promoter code;
   (e) processing redeemed applications comprising said promoter code;
   (f) establishing said accounts for said end users based on said processing of said redeemed account applications comprising said promoter code; an (g) issuing communications to said end users of said accounts, where said communications comprise said file information comprising said advertisements, as referenced by said promoter coding information, wherein said promoter is different than said offering entity.

6. The method of claim 5, wherein said method is conducted by said offering entity, or indirectly by a third party retained by, referred by, or linked via Internet or intranet with said offering entity, or by any combination of said offering entity and said third party.

7. The method of claim 5, wherein said account applications and said accounts relate to a financial card account and wherein said communications relate to the activity of said account or relate to reminders, tips or suggestions selected from one selected from a health or non-health related reminder, tip, or suggestion or advertisement.

8. The method of claim 5, wherein said communications include information selected from information related to the activity of said accounts; health related reminders;

tips or suggestions; non-health related reminders, tips or suggestions; said advertisements or any combination thereof.

9. The method of claim 5, wherein said communications include advertisements from a primary advertising entity or a third-party advertising entity.

10. The method of claim 5, wherein said advertisements for a time period set by said offering entity.

11. The method of claim 5, wherein said offering entity charges fees to said promoter for one selected from maintaining, accessing, or modifying said file information.

12. The method of claim 5, wherein said promoter may add, modify, revise, or delete information that will appear in said communications.

* * * * *